(12) United States Patent
Trumbore et al.

(10) Patent No.: US 7,857,904 B2
(45) Date of Patent: Dec. 28, 2010

(54) PROCESS OF PRODUCING ROOFING SHINGLE COATING ASPHALT

(75) Inventors: David C. Trumbore, Chicago, IL (US); David R. Jones, IV, Tampa, FL (US); Edward R. Harrington, Toledo, OH (US); Donn R. Vermilion, Newark, OH (US); Jason D. Guerra, Tinley Park, IL (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 358 days.

(21) Appl. No.: 12/002,648

(22) Filed: Dec. 18, 2007

(65) Prior Publication Data

US 2009/0000515 A1    Jan. 1, 2009

Related U.S. Application Data

(63) Continuation-in-part of application No. 11/823,634, filed on Jun. 28, 2007.

(51) Int. Cl.
*C08L 95/00* (2006.01)
(52) U.S. Cl. .......... 106/273.1; 106/270; 106/285
(58) Field of Classification Search .......... 106/270, 106/273.1, 285
See application file for complete search history.

(56) References Cited

U.S. PATENT DOCUMENTS

| | | | |
|---|---|---|---|
| 1,782,186 A | 11/1939 | Abson | |
| 2,179,208 A | 11/1939 | Burk et al. | |
| 2,200,914 A | 5/1940 | Burk et al. | |
| 2,375,117 A | 5/1945 | Lentz | |
| 2,450,756 A | 10/1948 | Holberg | |
| 2,649,384 A | 8/1953 | Anderson | |
| 2,762,755 A | 9/1956 | Kinnaird | |
| 3,126,329 A | 3/1964 | Fort | |
| 3,703,393 A | 11/1972 | Koons | |
| 4,328,147 A | 5/1982 | Chang et al. | |
| 4,338,137 A | 7/1982 | Goodrich | |
| 4,456,523 A * | 6/1984 | Carlos et al. | 208/5 |
| 4,497,921 A | 2/1985 | Chang et al. | |
| 4,544,411 A | 10/1985 | Wombles et al. | |
| 4,554,023 A | 11/1985 | Janicki | |
| 4,584,023 A | 4/1986 | Goodrich | |
| 4,659,389 A | 4/1987 | Wombles et al. | |
| 4,711,672 A | 12/1987 | Gorter et al. | |
| 4,780,146 A | 10/1988 | Chang | |
| 4,882,373 A | 11/1989 | Moran | |
| 4,885,210 A | 12/1989 | Vedove | |
| 5,059,300 A | 10/1991 | McGinnis | |
| 5,098,480 A | 3/1992 | McGinnis et al. | |
| 5,330,569 A | 7/1994 | McGinnis et al. | |
| 5,333,439 A | 8/1994 | Bozich et al. | |
| 5,393,811 A | 2/1995 | Moran et al. | |
| 6,060,550 A | 5/2000 | Simon et al. | |
| 6,120,913 A * | 9/2000 | Kluttz et al. | 428/521 |
| 6,258,255 B1 | 7/2001 | Gale | |
| 6,414,056 B1 | 7/2002 | Puzic et al. | |
| 6,451,394 B1 | 9/2002 | Marzari et al. | |
| 6,588,974 B2 | 7/2003 | Hildebrand et al. | |
| 6,852,806 B2 | 2/2005 | Sasagwa et al. | |
| 6,913,416 B2 | 7/2005 | Hildebrand et al. | |
| 7,317,045 B2 | 1/2008 | Zanchetta et al. | |
| 7,371,805 B2 | 5/2008 | Sasagawa et al. | |
| 7,696,267 B2 | 4/2010 | Sasagawa et al. | |
| 2005/0107521 A1 | 5/2005 | Sasagawa et al. | |
| 2005/0234193 A1 | 10/2005 | Sasagawa et al. | |
| 2007/0054987 A1 | 3/2007 | Zanchetta et al. | |
| 2007/0054988 A1 | 3/2007 | Zanchetta et al. | |
| 2007/0131578 A1 | 6/2007 | Ruan et al. | |

FOREIGN PATENT DOCUMENTS

| | | |
|---|---|---|
| CA | 1 260 653 | 9/1989 |
| EP | 0911377 B1 | 5/2004 |
| GB | 1084486 | 9/1967 |

OTHER PUBLICATIONS

Trumbore, David et al., Emission Factors for Asphalt-Related Emissions in Roofing Manufacturing, Enviromental Progress, Oct. 2005, 268-278, vol. 24, No. 3.
International Search Report dated Oct. 9, 2008 in PCT/US2008/068455.
International Search Report PCT/US2008/087464 dated Apr. 22, 2009.
Office Action issued in U.S. Appl. No. 12/002,681 filed Dec. 18, 2007, mailing date Aug. 31, 2010.
Office Action issued in U.S. Appl. No. 11/823,634 filed Jun. 28, 2007, mailing date Aug. 12, 2010.

* cited by examiner

*Primary Examiner*—Robert J Hill, Jr.
*Assistant Examiner*—Brian McCaig
(74) *Attorney, Agent, or Firm*—MacMillan, Sobanski & Todd, LLC

(57) ABSTRACT

A process of producing a roofing shingle coating asphalt from an asphalt feedstock includes the following steps. Wax and blowing catalyst are added to the asphalt feedstock. Then the asphalt feedstock is blown to produce the coating asphalt. The coating asphalt has a softening point within a range of from about 190° F. (88° C.) to about 235° F. (113° C.) and has a penetration of at least about 15 dmm at 77° F. (25° C.).

28 Claims, No Drawings

PROCESS OF PRODUCING ROOFING SHINGLE COATING ASPHALT

TECHNICAL FIELD AND INDUSTRIAL APPLICABILITY OF THE INVENTION

This invention relates in general to processes of producing asphalt roofing products, and in particular to a process of producing roofing shingle coating asphalt.

BACKGROUND OF THE INVENTION

Roofing shingle coating asphalts are usually produced by selecting a suitable feedstock asphalt and then processing that asphalt to provide the properties desired for use in a coating asphalt. For example, asphalt feedstocks used to produce coating asphalts for roofing shingles are usually chosen so that they can be air-blown to: 1) raise their softening point so that they maintain their dimensions at high temperatures on a roof; 2) lower their penetration into a range where it allows proper press of granules without becoming too brittle; 3) raise their melt viscosity so that when filler is added the filled coating viscosity is in a range that allows a roofing shingle process to run at high speeds; and 4) create a shingle that will perform over many years on the roof in spite of being exposed to sun, high temperatures and rain.

Historically coating asphalt for roofing shingles has been produced by choosing a special grade of asphalt as the feedstock to the air blowing process in order to meet these properties. These special grades of asphalt were often materials that were softer (higher penetration, lower viscosity) than paving grade asphalt and were often called "roofer's flux". Unfortunately, these special grades of asphalt that can be air-blown to make coating asphalts are increasingly in short supply and therefore can be costly compared to many other types of asphalt, particularly commodity paving asphalts. A new process that could use non-coating grade asphalts, such as, commodity paving asphalts or other asphalts that are harder than the normal special grades of asphalt, to produce quality coating asphalts for roofing shingles would be beneficial to the asphalt roofing product business.

BACKGROUND ART

Asphalts have been modified with waxes to produce a variety of roofing and industrial products. For example, Chang et al. (U.S. Pat. No. 4,382,989) discloses a roofing asphalt formulation containing oxidized coating grade asphalt, oxidized polyethylene and optionally saturant asphalt and filler. In one embodiment, the asphalt is oxidized to any degree, then unoxidized polyethylene is added, and then the oxidation process is continued to produce the roofing asphalt formulation. In a later improvement Chang et al. (U.S. Pat. No. 4,497,921) added sulfur to stabilize the mix. Janicki (U.S. Pat. No. 4,554,023) claimed a method of making a roofing shingle asphalt by blending bis-stearoylamide wax into asphalt, including blown asphalt, particularly asphalts with 143° F. softening points, with a benefit of lowering the viscosity of the asphalt product.

SUMMARY OF THE INVENTION

A process of producing a roofing shingle coating asphalt from an asphalt feedstock comprises the following steps. Wax and blowing catalyst are added to the asphalt feedstock. Then the asphalt feedstock is blown to produce the coating asphalt. The coating asphalt has a softening point within a range of from about 190° F. (88° C.) to about 235° F. (113° C.) and has a penetration of at least about 15 dmm at 77° F. (25° C.).

In a second embodiment, a process of producing a roofing shingle coating asphalt from an asphalt feedstock comprises the following. The asphalt feedstock is partially blown to raise its softening point to a first softening point that is lower than a target range. Wax is added to the partially blown asphalt. The asphalt is further blown to further raise its softening point to a second softening point that is within the target range. Blowing catalyst is added to the asphalt before or during the blowing. The process produces a coating asphalt having a softening point within the target range of from about 190° F. (88° C.) to about 235° F. (113° C.) and having a penetration of at least about 15 dmm at 77° F. (25° C.).

In a third embodiment, a process of producing a roofing shingle coating asphalt from an asphalt feedstock comprises the following steps. The asphalt feedstock is blown with a high level of blowing catalyst such that the blowing step is effective to raise the softening point of the asphalt to within a target range of from about 190° F. (88° C.) to about 235° F. (113° C.) and to lower the penetration of the asphalt to within a target range of from about 15 dmm to about 28 dmm at 77° F. (25° C.). The blowing step raises the melt viscosity of the asphalt to higher than a target range. Wax is added to the blown asphalt to lower its melt viscosity to within the target range of from about 130 cps to about 420 cps at 400° F. (204° C.).

Various aspects of the process will become apparent to those skilled in the art from the following detailed description of the preferred embodiments.

DETAILED DESCRIPTION AND PREFERRED EMBODIMENTS OF THE INVENTION

A process of producing a roofing shingle coating asphalt from an asphalt feedstock is described herein. The term "asphalt" is meant to include asphalts produced from petroleum refining, including residua from atmospheric distillation, from vacuum distillation, and from solvent deasphalting units. Mixtures of different asphalts can also be used. The invention can also be used with natural bitumen like the products extracted from the oil sands in Alberta or asphalts derived from oil sands by various refinery processes.

As used herein, the terms "roofing shingle coating asphalt" or "coating asphalt" mean an asphalt that is suitable for use as a coating asphalt to make asphalt roofing shingles. The asphalt has a softening point within a range of from about 190° F. (88° C.) to about 235° F. (113° C.) and has a penetration of at least about 15 dmm at 77° F. (25° C.). The softening point and penetration minimums are approximately as defined by ASTM D 3462 for asphalt roofing shingles.

In one embodiment, the "coating asphalt" meets one or more of the tighter specifications typically used by shingle manufacturers. There are a range of different manufacturer specifications. Some examples of these specifications include a softening point of about 200° F. (93° C.) to about 215° F. (102° C.), a penetration at 77° F. (25° C.) of about 16 dmm to about 28 dmm, a melt viscosity at 400° F. (204° C.) of about 130 cps to about 420 cps, a durability of greater than about 60 cycles in the weatherometer, and a flashpoint of greater than about 550° F. (288° C.). Other examples include a softening point of about 212° F. (100° C.) to about 220° F. (104° C.), a penetration at 77° F. (25° C.) of about 16 dmm to about 24 dmm, a melt viscosity at 400° F. (204° C.) of about 150 cps to about 400 cps, and a flashpoint of greater than about 550° F. (288° C.). In some manufacturers' specifications, a specific target penetration of about 15 dmm or about 17 dmm is used.

In addition manufacturers often specify other properties like stain index, for example a stain index less than about 10, as well as other tests that characterize rheology or durability.

The properties of the asphalt can be measured by any suitable tests. In the description provided herein, the asphalt properties are measured as follows: softening point or SP by ASTM D36; penetration or pen by ASTM D5 run at 25° C.; melt viscosity or visc by ASTM D4402 run at 400° F. (204° C.) with a Model LV Brookfield Viscometer, using a no. 18 spindle, 6 RPM or a Model RV Brookfield Viscometer, using a no. 21 spindle, 50 RPM; durability by ASTM D4798; flashpoint by ASTM D92; stain index by ASTM D2746; and stability by ASTM D3791 modified to run at oven temperature of 260° C. for up to 5 days or similar test procedure.

The "asphalt feedstock" for use in the process can be any suitable type of asphalt, including a non-coating grade asphalt such as a paving asphalt, a coating asphalt, an asphalt modified with a polymer, wax, solvent or other suitable material, or any suitable mixture of different asphalts.

By "non-coating grade asphalt", as used herein, is meant an asphalt that cannot be air blown to the ASTM softening point and penetration specifications for a coating asphalt. For example, the non-coating grade asphalt which is blown to a suitable softening point may have a penetration that is too low. Typically an asphalt that is not able to be used as feedstock for the air blowing process to make coating asphalt is lower penetration and higher viscosity as produced in the refinery.

In one embodiment, the "non-coating grade asphalt" is a paving grade asphalt or a mixture of different paving grade asphalts. Commodity paving asphalts are projected to remain in good supply for the foreseeable future and are typically less costly than coating grade asphalts such as roofer's fluxes. Paving asphalts typically are harder (lower penetration) and higher in softening point and viscosity than the asphalts typically used as feedstock to the air blowing process to make shingle coating asphalt. Typical of paving asphalts are the straight run asphalts derived from the atmospheric and vacuum distillation of crude oils, or are made by blending vacuum tower residua with residua from solvent deasphalting units.

Any suitable paving asphalt(s) can be used, for example paving asphalts which meet the PG64-22 specifications (AASHTO M320). PG64-22 is by far the most common paving specification in the United States. Paving asphalts were previously graded by viscosity and a common asphalt that is similar to the PG64-22 grade and usable in this process is the old AC20 grade (ASTM D3381). Some other examples of paving asphalts that may be suitable include PG67-22, PG-70-22, PG58-22, PG70-16, PG70-10, PG67-10, pen grade 40-50, pen grade 60-70, pen grade 85-100, pen grade 120-150, AR4000, AR8000, and AC30 grade.

In one embodiment, the process provides an advantage of being useful for producing coating asphalts from a wide array of different types of paving asphalts. For example, in one embodiment the process is suitable for use with all of the above-listed paving asphalts.

The polymer modified asphalt for use as the asphalt feedstock can be made from any suitable asphalt and any suitable polymer, or any suitable mixtures of different asphalts and/or different polymers. In some embodiments the polymers are elastomeric polymers, which are natural or synthetic rubbers and include, but are not limited to, butyl, polybutadiene, polyisoprene or polyisobutene rubber, styrene/butadiene copolymer such as styrene/butadiene/styrene triblock copolymer (SBS), styrene/ethylene-butylene/styrene triblock copolymer (SEBS), styrene/isoprene copolymer, epoxy modified acrylate copolymer (e.g., Elvaloy®), ethylene/vinyl acetate copolymer (EVA), ethylene/propylene/diene terpolymer (EPDM), polyacrylate, polymethacrylate and polychloroprene.

In a particular embodiment the polymer modified asphalt is a paving grade asphalt, for example a commodity paving asphalt, that has been modified with an elastomeric polymer. Some nonlimiting examples include SBS-modified paving asphalts such as PG76-22, PG70-28, PG76-28, etc.

The blowing process is an oxidizing process that comprises blowing an oxygen-containing gas (for example, air, oxygen or an oxygen-inert gas mixture) through the asphalt at an elevated temperature. The process involves loading the asphalt feedstock into a converter (oxidizer) at any suitable temperature, for example, a temperature of from about 200° C. to about 230° C. The gas is bubbled or blown through the molten asphalt. The reaction produced by the blowing is exothermic and raises the temperature of the asphalt to any suitable blowing temperature, for example, a temperature of from about 250° C. about 265° C. The maximum temperature is usually controlled by a water-cooled jacket. The process is usually carried out at ambient pressure, although it can also be carried out at elevated pressure. Also, the process is usually carried out in batches, although it can also be carried out continuously. The processing time of a standard blowing process may take from about 1 hour to about 15 hours to reach the final softening point. The processing time is dependent on the process temperature, the gas flow rate, the characteristics of the asphalt, the design of the process equipment, the concentration of oxygen in the gas, and the desired product.

Several catalysts are suitable for use in the air blowing process to either speed up the reaction or to create a final product with a higher penetration. Some examples of catalysts are ferric chloride and phosphoric acid.

A feature of the standard air blowing process is that once the input raw materials are chosen, and a catalyst is chosen, the penetration and viscosity of the final product are entirely dependent on the softening point to which the product is air blown. There are no effective ways to adjust the product to make higher or lower viscosities or penetrations after the material choice is made.

The blowing process generates flue gases typically containing hydrogen sulfide, sulfur oxides ($SO_x$), organosulfur compounds, hydrocarbons, nitrogen oxides ($NO_x$), carbon monoxide, and water. When ferric chloride is used as a catalyst the flue gases also contain hydrogen chloride. The use of phosphoric acid as a catalyst does not add any component to the flue gas. Prior to release into the atmosphere, the flue gases are typically passed through a water-sealed knockout tank and then subjected to an incineration process to control the emissions of volatile organic compounds (VOC's). In that process the sulfur compounds are all oxidized to sulfur oxides and the carbon monoxide is oxidized to carbon dioxide. The energy used to incinerate these fumes and the emissions that remain after incineration both increase as the processing time increases.

In a first embodiment of the present process, a wax and a blowing catalyst are added to the asphalt feedstock. Any suitable wax or a mixture of different waxes can be used. In one embodiment, the wax has a high congealing point or a high drop melt point of at least about 75° C., specifically at least about 90° C., and more specifically at least about 100° C. The term "melt point" as used herein refers broadly to either the congealing point or the drop melt point of the wax, which are defined by ASTM D 938 in the case of congealing point and ASTM D 3954 in the case of drop melt point. Also wax can be characterized by penetration or hardness (ASTM D5 or ASTM D 1321), density (ASTM D1505), viscosity (ASTM D 4402 or ASTM D88), or acid value (ASTM D 1386).

The wax can be a functionalized or synthetic wax or a naturally occurring wax. The wax can be oxidized or non-oxidized. Some examples of synthetic waxes that may be suitable include ethylene bis-stearamide wax (EBS), Fischer-Tropsch wax (FT), oxidized Fischer-Tropsch wax (FTO), polyolefin waxes such as polyethylene wax (PE), oxidized polyethylene wax (PEO), polypropylene wax, polypropylene/polyethylene wax, alcohol wax, silicone wax, petroleum waxes such as microcrystalline wax or paraffin, chlorinated wax or paraffin, and other synthetic waxes. Optionally, an EBS wax can be produced in the asphalt by in situ addition of stearic acid and amine. Any suitable order and timing of addition of the stearic acid and the amine can be used. For example, the acid can be added during the process and then a high molecular weight amine can be added at the end of the process to produce the wax. Some examples of functionalized waxes include amine waxes, amide waxes, ester waxes, carboxylic acid waxes, and microcrystalline waxes.

The naturally occurring wax can be derived from a plant, animal, or mineral. Some examples of natural waxes that may be suitable include plant waxes, such as, candelilla wax, carnauba wax, rice wax, Japan wax, and jojoba oil; animal waxes, such as, beeswax, lanolin, and whale wax; and mineral waxes, such as, montan wax, ozokerite, and ceresin.

Any suitable mixtures of different waxes can also be used. For example, the wax can include a blend of a Fischer-Tropsch wax and a polyethylene wax.

Certain types of waxes may be most effective for use with certain types of non-coating grade asphalts. In one embodiment, the wax is Fischer-Tropsch wax with a melt point of greater than 100° C. and a hardness at 25° C. from 1 dmm to a value so soft that it could not be measured by the techniques in ASTM D5. In another embodiment the wax is a polyethylene wax with a melt point of 100 to 125° C., a hardness at 25° C. of 1 to 7 dmm, a density of from 0.91 to 0.95 gm/cc, a viscosity of 20 to 450 cps at 140° C., and a nil acid number. In a third embodiment the wax is an oxidized polyethylene wax with melt point of 135 to 140° C., hardness <0.5 dmm, viscosity of 3600 cps to 4500 cps at 150° C., and acid number of 30.

The wax can be added in any suitable amount. In one embodiment, it is added in an amount within a range of from about 0.5% to about 8% by total weight of the wax and the asphalt, and typically from about 1% to about 4% or from about 1% to about 3% or from about 2% to about 3%.

Also, any type of blowing catalyst, or a mixture of different blowing catalysts, can be added to the asphalt feedstock. Some examples of blowing catalysts that may be suitable include phosphoric acid, ferric chloride, phosphorus pentoxide, aluminum chloride, hydrohalic acid, and boric acid. In one embodiment, the blowing catalyst is phosphoric acid and/or ferric chloride. For example, ferric chloride can be used to speed up the air blowing process and to create a final product with a higher penetration.

Phosphoric acid blowing catalyst can be provided in any suitable form, or a mixture of different forms of phosphoric acid. For example, some different forms include phosphoric acid, polyphosphoric acid, superphosphoric acid, orthophosphoric acid, pyrophosphoric acid, and triphosphoric acid. Another suitable form of phosphoric acid is green phosphoric acid, which is prepared by adding sulfuric acid to phosphate ore to make crude phosphoric acid. The green phosphoric acid usually contains from about 52% to about 94% phosphoric acid by weight and the remainder sulfuric acid and other materials. When the term "phosphoric acid" is used in the description and claims herein it includes all different forms of phosphoric acid.

The blowing catalyst can be added in any suitable amount. If phosphoric acid is used, in one embodiment it is added in an amount within a range of from about 0.1% to about 5% or from about 0.5% to about 5% of active phosphoric acid weight by total weight of the phosphoric acid and asphalt, and typically from about 1% to about 2%. For example, if the target is to include 5% active phosphoric acid in an asphalt/phosphoric acid mix weighing 100 grams, this could be added in the form of 5 grams of 100% phosphoric acid, 5.88 grams of 85% phosphoric acid, or 4.35 grams of 115% polyphosphoric acid.

After the wax and blowing catalyst are added to the asphalt feedstock, the asphalt is fully blown to raise its softening point to a final softening point that is within a target softening point range of from about 190° F. (88° C.) to about 235° F. (113° C.). The coating asphalt also has a penetration of at least about 15 dmm at 77° F. (25° C.).

Optionally, a polymer can be added to the asphalt at any time during the process. Any suitable polymer or a mixture of different polymers can be used. Some nonlimiting examples of polymers that may be suitable include polyethylene, polypropylene, styrene/butadiene/styrene triblock copolymer, styrene/ethylene-butylene/styrene triblock copolymer, epoxy modified acrylate copolymer, ethylene/vinyl acetate copolymer, or mixture thereof.

Example 1

A PG64-22 paving asphalt is used as the feedstock asphalt. A polyethylene wax in the amount of 3% and a phosphoric acid blowing catalyst in the amount of 1.5% are added to the asphalt feedstock. The asphalt feedstock is then blown to produce the coating asphalt. The coating asphalt has a softening point of 203° F. (95° C.) and a penetration of 16 dmm at 77° F. (25° C.), both of which are within the target ranges.

In a second embodiment of the present process, a wax is added to the asphalt at any time during the blowing of the asphalt. In other words, the wax is added after the blowing has started but before the blowing has been completed. The blowing of the asphalt can be a continuous process in which the wax is added during the blowing, or the blowing can be a step process in which the asphalt is partially blown, then the wax is added, and then the asphalt is further blown to the target softening point range.

In either a continuous or step process, the asphalt feedstock is partially blown to raise its softening point to a first softening point that is lower than the target softening point range. The first softening point can be any suitable softening point that is above the initial softening point but below the target softening point range. For example, the first softening point may be within a range of from about 120° F. (49° C.) to about 185° F. (85° C.).

The wax is added to the partially blown asphalt. Any suitable wax or a mixture of different waxes can be used, such as, any of those described above in the amounts described. In some embodiments, the wax addition may raise the softening point of the asphalt but in other embodiments it may not substantially affect the softening point or may even lower the softening point. After the wax addition the softening point of the asphalt may be lower than the target range, for example within the first softening point range described above, or it may be within the target range.

After the wax addition, the asphalt is further blown to further raise its softening point to a second softening point that is within the target softening point range. The coating asphalt also has the above-described penetration property.

A blowing catalyst is added to the asphalt before or during the partial blowing or further blowing. Any suitable type of blowing catalyst(s) in any suitable amount can be added, such as any of these described above in the amounts described. In one embodiment, the blowing catalyst comprises phosphoric acid.

Like in the first embodiment, optionally a polymer or a mixture of different polymers can be added to the asphalt at any time during the process. The polymer(s) can be any of those described above or others.

Example 2

A PG64-22 paving asphalt is used as the feedstock asphalt. The paving asphalt is partially blown with 1.5% phosphoric acid to raise its softening point to 172° F. (78° C.), which is lower than the target softening point range. A Fischer Tropsch wax in the amount of 3% is added to the partially blown asphalt. The asphalt is then further blown to further raise its softening point to a second softening point of 203° F. (95° C.) that is within the target range. The resulting coating asphalt has a penetration of 16 dmm at 77° F. (25° C.) which is within the target range.

In a third embodiment of the present process, the asphalt feedstock is blown with a high level of blowing catalyst such that the blowing step is effective to raise the softening point of the asphalt to within the target range of from about 190° F. (88° C.) to about 235° F. (113° C.) and to lower the penetration of the asphalt to within the target range of from about 15 dmm to about 28 dmm at 77° F. (25° C.). Any suitable blowing catalyst in any suitable amount can be used. For example, when the blowing catalyst comprises phosphoric acid it may be added in an amount within a range of from about 2% to about 7% (active) by total weight of the phosphoric acid and the asphalt, and in a particular embodiment from about 2.5% to about 4%.

The blowing step raises the melt viscosity of the asphalt to a first or intermediate melt viscosity that is higher than the target melt viscosity range of from about 130 cps to about 420 cps at 400° F. (204° C.). The first melt viscosity can be any suitable viscosity, for example a melt viscosity within a range of from about 425 cps to about 500 cps at 400° F. (204° C.).

A wax is added to the blown asphalt to lower its melt viscosity to within the target range. Any suitable wax or a mixture of different waxes can used, such as, any of those described above or others. Also, the wax can be added in any suitable amount, for example any of the amounts described above.

Like in the first embodiment, optionally a polymer or a mixture of different polymers can be added to the asphalt at any time during the process.

Example 3

A PG64-22 paving asphalt is used as the feedstock asphalt. The paving asphalt is partially blown with a high level of blowing catalyst (3% phosphoric acid) to raise its softening point to 215° F. (102° C.) which is within the target range, and to lower its penetration to 20 dmm at 77° F. (25° C.) which is within the target range. However, the melt viscosity of the asphalt is 510 cps at 400° F. (204° C.), which is above the target melt viscosity range. An ethylenebisstearamide wax in the amount of 3% is added to the blown asphalt to lower its melt viscosity to melt viscosity of 390 cps at 400° F. (204° C.) which is within the target range of about 130 cps to about 420 cps at 400° F. (204° C.). The softening point of the product asphalt is 219° F. (98° C.) and the penetration is 17 dmm at 77° F. (25° C.), both of which are still within the target ranges.

In any of the above embodiments, a polymer modified asphalt can be blended with the coating asphalt which is produced by the process. Any suitable polymer modified asphalt can be used, such as any of those described above or others. The coating asphalt and the polymer modified asphalt can be blended in any suitable amounts. The polymer modified asphalt may be added, for example, to improve one or more of the properties of the resulting asphalt product.

The principle and mode of operation of this process have been described in its preferred embodiments. However, it should be noted that the process may be practiced otherwise than as specifically described without departing from its scope.

What is claimed is:

1. A process of producing a roofing shingle coating asphalt from an asphalt feedstock comprising the following steps:
    adding wax and a blowing catalyst to the asphalt feedstock; and then
    blowing the asphalt feedstock to produce the coating asphalt;
    the coating asphalt having a softening point within a range of from about 190° F. (88° C.) to about 235° F. (113° C.) and having a penetration of at least about 15 dmm at 77° F. (25° C.),
    wherein said wax has a melt point of at least about 90° C.

2. The process of claim 1 wherein the blowing catalyst comprises phosphoric acid added in an amount within a range of from about 0.1% to about 5% by total weight of the phosphoric acid and the asphalt.

3. The process of claim 1 wherein the wax has a melt point of at least about 100° C.

4. The process of claim 1 wherein the feedstock asphalt comprises paving asphalt.

5. The process of claim 1 wherein the feedstock asphalt comprises polymer modified asphalt.

6. The process of claim 1 wherein the coating asphalt has a melt viscosity within a range of from about 130 cps to about 420 cps at 400° F. (204° C.).

7. The process of claim 1 wherein the coating asphalt has a durability of greater than about 60 cycles in a weatherometer.

8. The process of claim 1 wherein the coating asphalt has a stain index less than about 10.

9. The process of claim 1 further comprising adding a polymer to the asphalt at any time during the process.

10. The process of claim 1 further comprising blending a polymer modified asphalt with the coating asphalt produced by the process.

11. A process of producing a roofing shingle coating asphalt from an asphalt feedstock comprising:
    partially blowing the asphalt feedstock to raise its softening point to a first softening point that is lower than a target range;
    adding wax to the partially blown asphalt, said wax having a melt point of at least about 90° C.; and
    further blowing the asphalt to further raise its softening point to a second softening point that is within the target range; and
    adding a blowing catalyst to the asphalt before or during the blowing;
    the process producing a coating asphalt having a softening point within the target range of from about 190° F. (88° C.) to about 235° F. (113° C.) and having a penetration of at least about 15 dmm at 77° F. (25° C.).

12. The process of claim 11 wherein the blowing catalyst comprises phosphoric acid added in an amount within a range of from about 0.1% to about 5% by total weight of the phosphoric acid and the asphalt.

13. The process of claim 11 wherein the feedstock asphalt comprises paving asphalt.

14. The process of claim 11 wherein the feedstock asphalt comprises polymer modified asphalt.

15. The process of claim 11 wherein the coating asphalt has a melt viscosity within a range of from about 130 cps to about 420 cps at 400° F. (204° C.).

16. The process of claim 11 wherein the coating asphalt has a durability of greater than about 60 cycles in a weatherometer.

17. The process of claim 11 wherein the coating asphalt has a stain index less than about 10.

18. The process of claim 11 further comprising adding a polymer to the asphalt at any time during the process.

19. The process of claim 11 further comprising blending a polymer modified asphalt with the coating asphalt produced by the process.

20. The process of claim 11, wherein said wax has a melt point of at least about 100° C.

21. A process of producing a roofing shingle coating asphalt from an asphalt feedstock comprising the following steps:

blowing the asphalt feedstock with a high level of blowing catalyst such that the blowing step is effective to raise the softening point of the asphalt to within a target range of from about 190° F. (88° C.) to about 235° F. (113° C.) and to lower the penetration of the asphalt to within a target range of from about 15 dmm to about 28 dmm at 77° F. (25° C.), the blowing step raising the melt viscosity of the asphalt to higher than a target range; and adding wax to the blown asphalt after said blowing step to lower its melt viscosity to within the target range of from about 130 cps to about 420 cps at 400° F. (204° C.); and blending a polymer modified asphalt with the blown asphalt.

22. The process of claim 21 wherein the blowing catalyst comprises phosphoric acid.

23. The process of claim 22 wherein the phosphoric acid is added in an amount within a range of from about 2% to about 7% active by total weight of the phosphoric acid and the asphalt.

24. The process of claim 21 wherein the feedstock asphalt comprises paving asphalt.

25. The process of claim 21 wherein the wax is added in an amount within a range of from about 0.5% to about 8% by total weight of the wax and the asphalt.

26. The process of claim 21, wherein said blowing catalyst is added in an amount from about 2 to about 7% by weight of said blowing catalyst and said asphalt.

27. The process of claim 21, wherein said wax has a melt point of at least about 90° C.

28. The process of claim 21, wherein said wax has a melt point of at least about 100° C.

\* \* \* \* \*